US009122507B2

(12) United States Patent  
Srinivasan et al.

(10) Patent No.: US 9,122,507 B2
(45) Date of Patent: Sep. 1, 2015

(54) VM MIGRATION BASED ON MATCHING THE ROOT BRIDGE OF THE VIRTUAL NETWORK OF THE ORIGINATION HOST AND THE DESTINATION HOST

(75) Inventors: Udayakumar Srinivasan, Fremont, CA (US); Anuraag Mittal, San Jose, CA (US); Sudarshana Kandachar Sridhara Rao, Karnataka (IN); Suraj Nellikar, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 735 days.

(21) Appl. No.: 13/400,046

(22) Filed: Feb. 18, 2012

(65) Prior Publication Data
US 2013/0219384 A1 Aug. 22, 2013

(51) Int. Cl.
*G06F 9/455* (2006.01)
*G06F 9/46* (2006.01)
*H04L 12/46* (2006.01)

(52) U.S. Cl.
CPC .......... *G06F 9/45558* (2013.01); *H04L 12/462* (2013.01); *G06F 2009/4557* (2013.01); *H04L 12/4641* (2013.01)

(58) Field of Classification Search
CPC .............. G06F 9/5077; G06F 9/45558; G06F 9/45533; G06F 2009/4557; H04L 29/08144
See application file for complete search history.

(56) References Cited

U.S. PATENT DOCUMENTS

| 2004/0081171 | A1* | 4/2004 | Finn ........................ 370/395.53 |
| 2010/0214949 | A1 | 8/2010 | Smith et al. |
| 2012/0159634 | A1* | 6/2012 | Haikney et al. ................. 726/25 |
| 2012/0173757 | A1* | 7/2012 | Sanden ........................ 709/238 |

OTHER PUBLICATIONS

Crump (network limitation to cloud computing and network convergence Oct. 2010, storage-switzerland.com , pp. 1-4).*
"Cisco Nexus 1000V Series Switches Deployment Guide Version 3, Deployment Guide," Cisco Systems, Inc., Nov. 2012, 44 pages tinyurl.com/N1k-Deploy-Guide.
"Cisco Nexus 100v Series Switches for VMWare vSphere," Cisco Data Sheet, Cisco Data Sheet, Sep. 2013, 22 pages cisco.com/en/US/prod/collateral/switches/ps9441/ps9902/data_sheet_c78-492971.pdf.
"VMware and Cisco Virtualization Solution: Scale Virtual Machine Networking," Cisco Brochure, Cisco Systems, Inc., Jul. 2009, 4 pages cisco.com/en/US/prod/collateral/switches/ps9441/ps9902/brochure_c02-552517.pdf.
"VMware vSphere, The Best Platform for Cloud Infrastructures," VMware, Inc. Product Brochure, Published on or about May 11, 2011; 8 pages vmware.com/files/pdf/vsphere_enterprise_datasheet.pdf.

* cited by examiner

*Primary Examiner* — Meng An
*Assistant Examiner* — Caroline H Arcos
(74) *Attorney, Agent, or Firm* — Patent Capital Group

(57) ABSTRACT

A method is provided in one example embodiment that includes detecting a migration of a virtual machine from an origination host to a destination host and comparing a first root bridge to a second root bridge to verify data link layer continuity of the virtual network on the destination host. The virtual machine is connected to a virtual network, the first root bridge is associated with the virtual network on the origination host and the second root bridge is associated with the virtual network on the destination host. The method may further include blocking the migration if the first root bridge and the second root bridge are not the same.

14 Claims, 4 Drawing Sheets

VM MIGRATION BASED ON MATCHING THE ROOT BRIDGE OF THE VIRTUAL NETWORK OF THE ORIGINATION HOST AND THE DESTINATION HOST

TECHNICAL FIELD

This disclosure relates in general to the field of information technology, and more particularly, to a system and a method for verifying layer 2 connectivity in a virtual environment.

BACKGROUND

The evolution of virtualization techniques in information technology has led to a variety of applications, from cloud-based computing to embedded systems in mobile phones. In general, virtualization obscures hardware characteristics of a computing platform and, instead, presents an abstract platform that can host other platforms, including complete operating systems. One popular virtualization technique is to deploy a hypervisor (also known as a virtual machine manager), which can allow guest software (including complete operating systems) to run concurrently on an abstract host platform. The hypervisor can provide a simulated computing environment, often referred to as a "virtual machine," for its guest software. Thus, multiple disparate operating systems can run in separate virtual partitions under a hypervisor on a single chassis, for example. Virtual machines can also be migrated (under live conditions) between hosts. However, efficiently managing resources in a virtual environment continues to present significant challenges to developers and operators alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment that includes detecting a migration of a virtual machine from an origination host to a destination host. These individual posts may be at any location in the network. The method may also include comparing a first root bridge to a second root bridge to verify data link layer continuity of the virtual network on the destination host. The term 'comparing' in this context includes any activity associated with evaluating, analyzing, identifying, referencing, examining, or otherwise processing one or more data segments (e.g., potentially against each other, or within a table, a database, etc.). The virtual machine can be connected to a virtual network, the first root bridge may be associated with the virtual network on the origination host, and the second root bridge may be associated with the virtual network on the destination host. The method may further include blocking the migration if the first root bridge and the second root bridge are not the same.

In more particular embodiments, the first root bridge may be identified by evaluating spanning tree protocol data units associated with the origination host, and the second root bridge may be identified by evaluating spanning tree protocol data units associated with the destination host. The detecting of the migration can include receiving a request from the origination host to verify data link layer continuity of the virtual network on the destination host. In addition, the detecting of the migration may include receiving a request from a hypervisor manager system to verify data link layer continuity of the virtual network on the destination host.

EXAMPLE EMBODIMENTS

Figure 1:
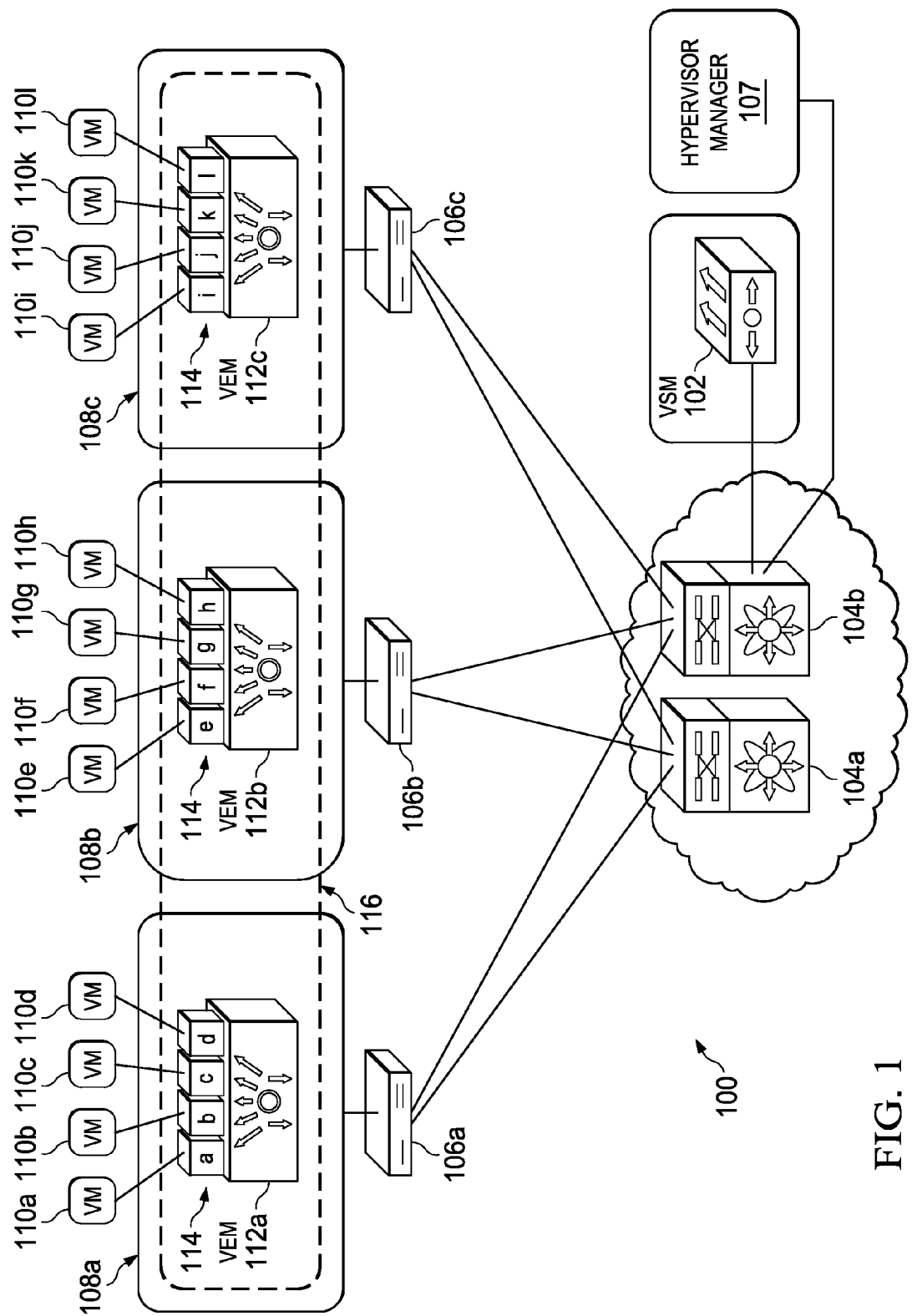
FIG. 1 is a simplified block diagram illustrating an example embodiment of a virtualized network environment in which layer 2 connectivity can be verified for virtual machine migration in accordance with this disclosure.

Turning to FIG. 1, FIG. 1 is a simplified block diagram of an example embodiment of a virtualized network environment 100 in which layer 2 connectivity can be verified for a suitable virtual machine migration. Network environment 100 may include a virtual supervisor module (e.g., VSM 102), network access switches (e.g., network access switches 104a-104b), virtualized platforms (e.g., platforms 106a-106c), and a hypervisor manager 107. Each virtualized platform may deploy an instance of a hypervisor (e.g., hypervisors 108a-108c), which can be configured for managing multiple virtual partitions. In general, a virtual partition may be an instance of a virtual machine (e.g., virtual machines 110a-110l), sandbox, container, or any other isolated environment that can have software operating within it. The software may include an operating system and application software. For software running within a virtual partition, the virtual partition may appear to be a distinct physical machine. In certain embodiments, hypervisors 108a-108c may be native or "bare metal" hypervisors that run directly on hardware, but that may alternatively run under host software (i.e., a virtualization host) executing on hardware. Virtual Ethernet modules (VEMs) such as VEMs 112a-112c may operate within each hypervisor and provide dedicated virtual switch ports (e.g., virtual switch ports 114a-114l) for each virtual machine to provide connectivity in a virtual network. A distributed virtual switch, such as a distributed virtual switch 116, is a collection of VEMs, such as VEMs 112a-112c.

Each of the elements of FIG. 1 may couple to one another through simple interfaces (tangible or virtual) or through any other suitable connection (wired or wireless), which provides a viable pathway for network communications. Additionally, any one or more of these elements of FIG. 1 may be combined or removed from the architecture based on particular configuration needs. Network environment 100 may include a configuration capable of transmission control protocol/Internet protocol (TCP/IP) communications for the transmission or reception of packets in a network. Network environment 100 may also operate in conjunction with a user datagram protocol/IP (UDP/IP), or any other suitable protocol where appropriate and based on particular needs.

For purposes of illustrating systems and methods for verifying layer 2 connectivity in a virtualized environment, it is important to understand certain activities and communications occurring within such an environment. The following foundational information may be viewed as a basis from which the present disclosure may be properly explained. Such information is offered earnestly for purposes of explanation only and, accordingly, should not be construed in any way to limit the broad scope of the present disclosure and its potential applications.

Server virtualization and consolidation have become a central strategy for many server initiatives that try to address growing demands for server resources, while still combating server sprawl. While server virtualization delivers well-documented benefits to a server platform, it introduces a number of complications for the network. At the very least, these complications can reduce operational efficiency for the network and, in some circumstances, they can have a broader and more significant effect on the data center.

One significant challenge (from a network perspective) is the lack of visibility into the virtual machine environment. In a traditional physical environment, with one server per network port, the process of mapping necessary policies for features (e.g., such as security and quality of service (QoS) to that server) can be relatively straightforward. In a virtualized environment, dozens of virtual servers may be connected to a physical port through a software switch that resides on the server (e.g., as part of a hypervisor). Such an arrangement can require reassessment to determine the best way to support a virtualized environment.

Because dozens of virtual machines may reside on one physical port, each with different network and security policy requirements, an application of a policy at the physical port level can become difficult. Such an approach can severely complicate the ability of the network and server teams to ensure that the correct network policy is applied to a particular virtual machine (i.e., a particular application).

This same challenge extends to troubleshooting scenarios. For example, in a physical environment, if users of an application are experiencing application-responsiveness problems, the traffic on the port (to which the server running the application is connected) can easily be analyzed to determine whether a network component is causing the problem. In a virtualized environment, the traffic from all the virtual machines is blended together, so isolating traffic from a particular virtual machine at the physical port is much more difficult. In addition, because of the software switch in the hypervisor, the network team cannot use the same tools and processes it would normally use to troubleshoot and manage the rest of the network. One additional transparency-related concern arises from the hypervisor-based switch. Traffic can be switched between virtual machines on the same server without any capability to control or audit this interaction, a situation that introduces a number of concerns related to security and policy compliance.

A significant benefit of server virtualization is live migration (i.e., the capability to move a running virtual machine from one physical server to another without any disruption). This feature has clear benefits for capabilities such as resource balancing, system availability, and even simple server maintenance activities. For example, hypervisor manager 107 may migrate a virtual machine to optimize resource use, to facilitate maintenance activities, or to proactively move virtual machines away from failing or underperforming servers. However, migration can also introduce significant challenges.

Foremost among these challenges is the fact that, as a virtual machine moves, its network policy (virtual network, QoS features, security policy, etc.) should also move. In the past, movement of policy along with the virtual machine has generally been handled through one of two scenarios. In the first scenario, all servers are adjacent at the data link layer (also commonly known as the "link layer" or "layer 2") and all services are mapped to all ports. While this scenario maintains the flexibility of live migration, it is generally counter to the best practices for network design and for security. In the second scenario, live migration is simply not used, which undermines much of the potential value of a server virtualization strategy.

One subtle challenge of live migration is that an administrator can never truly be sure where a virtual machine is running. A virtual machine may be manually (or automatically) moved from one server to another for any number of reasons, so the network should be capable of provisioning all services everywhere, and yet deliver services exactly when and where they are needed.

Thus, server virtualization can invalidate some common assumptions of server access network design, including the assumption that each network access port corresponds to a single physical server running a single operating system image. Server virtualization can also invalidate the static nature of the relationship between an operating system and a network. It effectively enables operating system images to become mobile. The consequences of this new level of mobility on the network are not trivial. Virtual machine mobility can also break features that have been implemented in a network under the assumption that computing is relatively static, and that moving a physical server in a data center is not practical to do frequently.

A virtual switch may be implemented as part of a hypervisor to overcome some of these obstacles. In general, a virtual machine may be deployed with a virtual network interface card (vNIC) that can logically connect the virtual machine to a virtual switch, which allows the virtual machine to send and receive data over a virtual network (e.g., a virtual local area network or "vLAN") through that interface. If two vNICs attached to the same virtual switch need to communicate with each other, the virtual switch can perform layer 2 switching in the virtual network, without any need to send traffic to the physical network.

However, if several virtual platforms are deployed in a data center, each virtual switch represents an independent point of configuration that an administrator should maintain and secure (often without the benefit of managing and monitoring, which may be available throughout the rest of the infrastructure). Moreover, the administrator should manually ensure that migrations of virtual machines can take place without breaking network policies or basic connectivity.

A distributed virtual switch (such as distributed virtual switch 116) can overcome many of the limitations of independent virtual switches. A distributed virtual switch effectively decouples the control and data planes of the embedded switch and allows multiple, independent virtual switches (e.g., VEMs) to be managed by a centralized management system (e.g., a VSM). A distributed virtual switch can provide a consistent network feature set and a provisioning process from the virtual machine access layer to the core of the data center network infrastructure. Virtual platforms can use the same network configuration, security policy, diagnostic tools, and operational models as their physical counterparts attached to dedicated physical network ports. Virtualization administrators can access a predefined network policy that can follow virtual machines during migration.

Live migration is often automated and moved from one platform to another using a network layer (commonly referred to as "layer 3") management infrastructure, with the assumption that the data link layer upstream connectivity for the virtual machine will remain similar. However, connectivity of the data link layer (which is generally responsible for delivering frames between adjacent network nodes in a wide area network or between nodes on the same local area network segment) is not always similar. For example, consider two servers with vNICs on a virtual local area network (vLAN) ID #10 and hosting a virtual machine connected to vLAN ID #100. Even if vLAN ID #100 is disjoint, the migration can still be performed as it uses vLAN ID #10 for the operation, but the virtual machine loses connectivity on vLAN ID #100. Such a disruption can have a significant impact for business critical applications that may be operating within a cluster.

In accordance with embodiments disclosed herein, network environment 100 can overcome these shortcomings (and others) by verifying layer 2 paths when migrating virtual machines. In more particular embodiments, root bridge information from Spanning Tree Protocol (STP) Bridge Protocol Data Units (BPDUs) can be used to verify layer 2 paths. For example, virtual switches can listen to STP BPDUs and store root bridge data based on vLANs. The root bridge data can be propagated to a virtual supervisor module, which can detect inconsistencies in layer 2 connectivity within a cluster.

During a live migration across servers/virtual switches in a virtual cluster environment, the root bridge can be checked for the vLAN(s) with which a virtual machine is associated. If the root bridge of the destination host matches the root bridge of the origination host, the live migration can be allowed. If not, the operation can generate an error, such as via syslogs, or the migration can be blocked. The root bridge information can also be used to detect disjoint layer 2 networks for a virtual clustered environment. For example, if two servers hosting virtual machines on a certain vLAN are in a disjoint vLAN network, the root bridge ID on the servers for the vLAN would be different and this information can be suitably logged.

Logistically, the BPDU discussed herein can be any type of packet communication and/or data segment. A port associated with the particular link can be blocked (e.g., in response to evaluating a given BPDU). In such a context, 'blocked' simply means that data propagation would be limited in some appropriate manner (e.g., dropped, deleted, delayed, put in a certain queue, stored it in the appropriate location, forwarded away from its intended destination, etc.). Furthermore, the data link layer connectivity data is reflective of any suitable packet information and/or data segment (or layer 2 data of any kind) that can provide a signal, an identifier, an object, a flag, a TCP field setting, etc. to a particular node of the network. data link layer continuity Note that STP commonly runs on network elements (e.g., a switch) and, further, operates to maintain a loop-free topology in an L2 switched network. The term spanning tree protocol (STP) as used herein includes any version of STP, including for example, traditional STP (IEEE 802.1d), rapid spanning tree protocol (RSTP) (IEEE 802.1w), multiple spanning tree protocol (MSTP) (IEEE 802.1s), or any other spanning tree protocol. Network elements may use STP to set/provision network topologies and/or to prevent loops, whereas other devices may be configured to use protocols other than STP (e.g., an intermediate system to intermediate system (IS-IS) protocol) to obviate network problems. Clouds can often form a virtual network, where a cloud is defined as a set of one of more virtual elements, network switches, bridges, and/or end hosts: all of which may be interconnected. Inconsistencies in connectivity and in network topology create an opportunity for problematic network scenarios to develop. Such scenarios can be eliminated in accordance with the teachings of the present disclosure by effectively snooping STP BPDU information, as detailed below.

Figure 2A:
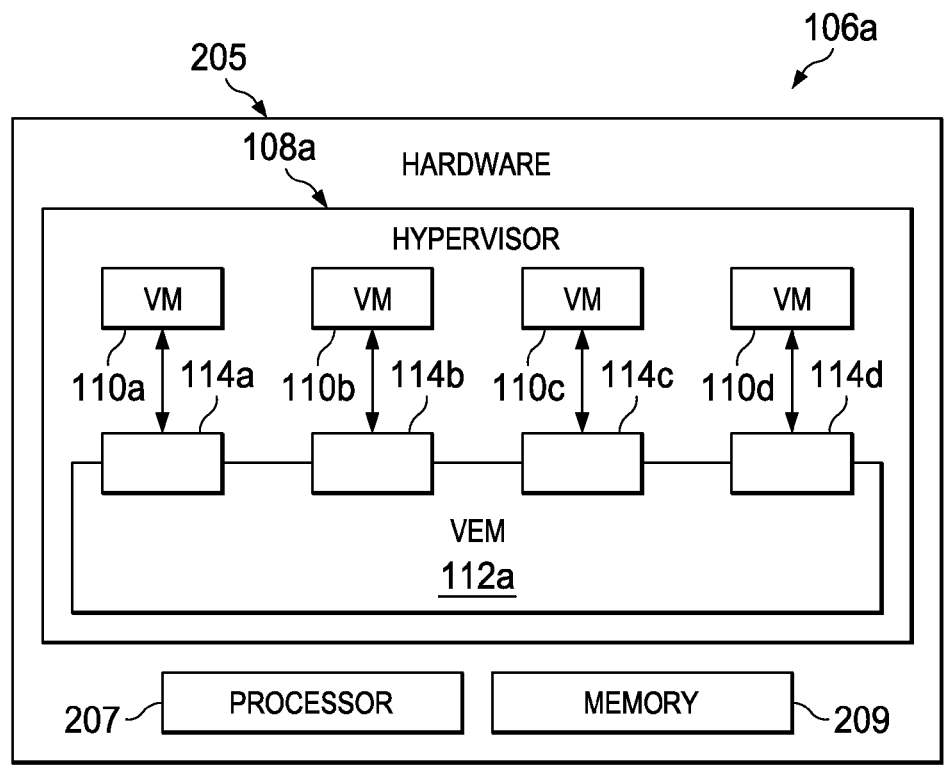
FIG. 2A is a simplified block diagram illustrating an example embodiment of a virtualized platform in the network environment.

Turning to FIG. 2A, FIG. 2A is a simplified block diagram illustrating an example embodiment of a virtualized platform, such as virtualized platform 106a in network environment 100. Virtualized platform 106a includes an instance of hardware 205, hypervisor 108a, virtual machines 110a-110d, virtual Ethernet module 112a, and virtual switch ports 114a-114d. In general, hardware 205 represents any machine or apparatus that is capable of accepting, performing logic operations on, storing, or displaying data, and may include (without limitation) a processor 207 and an instance of a memory 209.

Figure 2B:
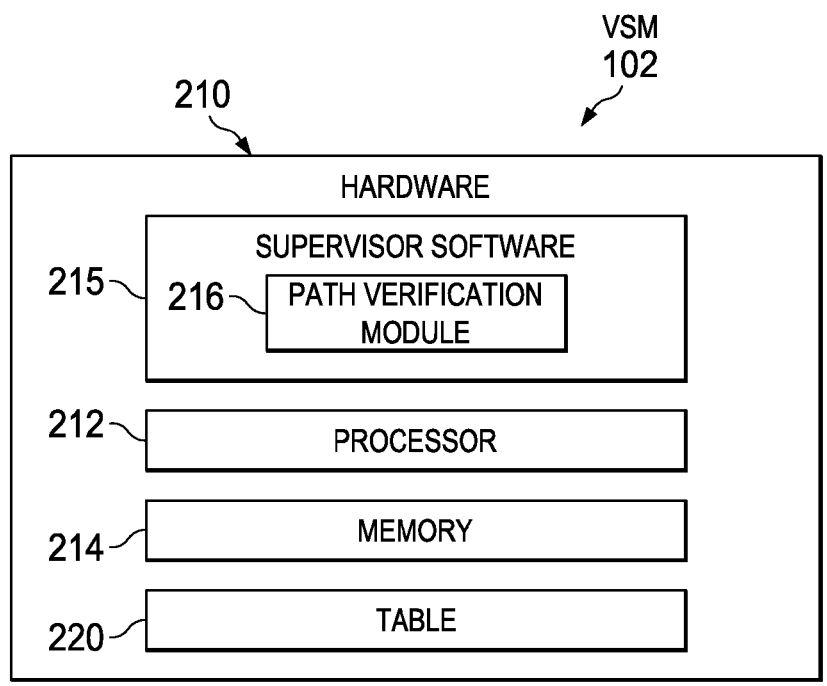
FIG. 2B is a simplified block diagram illustrating an example embodiment of a virtual supervisor module in the network environment.

FIG. 2B is a simplified block diagram illustrating an example embodiment of a virtual supervisor module, such as VSM 102, in network environment 100. VSM 102 includes an instance of hardware 210, and an instance of supervisor software 215. Supervisor software generally consists of software modules, for example, including a path verification module 216. In general, hardware 210 represents any machine or apparatus that is capable of accepting, performing logic operations on, storing, or displaying data, and may include without limitation a processor 212 and an instance of a memory 214. VSM 102 may additionally include one or more tables, lists, or other data structures (e.g., a table 220) for storing data associated with certain operations described herein.

In one example implementation, VSM 102, network access switches 104a-104b, and/or virtualized platforms 106a-106c are network elements, which are meant to encompass network appliances, servers, routers, switches, firewalls gateways, bridges, loadbalancers, modules, or any other suitable device, proprietary component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with elements of network environment 100, each of VSM 102, network access switches 104a-104b, and/or virtualized platforms 106a-106c can include memory elements for storing information to be used in the migration operations outlined herein. Additionally, virtualized platforms 106a-106c may also include virtual memory elements for storing information associated with virtual partitions, such as virtual machines 110a-110l. Each of VSM 102, network access switches 104a-104b, and/or virtualized platforms 106a-106c may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, or in any other suitable component, device, element, or object where appropriate and based on particular needs. Any of the memory elements discussed herein (e.g., memory 209 and 214) should be construed as being encompassed within the broad term "memory element" or "memory." Information being used, tracked, sent, or received by VSM 102, network access switches 104a-104b, and/or virtualized platforms 106a-106c could be provided in any database, register, queue, table, cache, control list, or other storage structure, all of which can be referenced at any suitable timeframe. Any such storage options may be included within the broad term "memory element" or "memory" as used herein.

In certain example implementations, the migration functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory media. In some of these instances, memory elements can store data used for the operations described herein. This includes the memory elements being able to store software, logic, code, or processor instructions that are executed to carry out the activities described herein.

In one example implementation, VSM 102, network access switches 104a-104b, and/or virtualized platforms 106a-106c may include software modules (e.g., an instance of a path verification module) to achieve, or to foster migration operations as outlined herein. In other embodiments, such operations may be carried out by hardware, implemented externally to these elements, or included in some other network device to achieve the intended functionality. Alternatively, these elements may include software (or reciprocating software) that can coordinate in order to achieve the operations, as outlined herein. In still other embodiments, one or all of these devices may include any suitable algorithms, hardware, software, components, modules, interfaces, or objects that facilitate the operations thereof.

Additionally, each of VSM 102, network access switches 104a-104b, and/or virtualized platforms 106a-106c may include a processor that can execute software or an algorithm to perform the migration activities, as discussed herein. Additionally, virtualized platforms 106a-106c may provide one or more virtual processors that can execute software or an algorithm to perform activities associated with virtual partitions, such as virtual machines 110a-110l. A processor or virtual processor can execute any type of instructions associated with the data to achieve the operations detailed herein. In one example, the processors (as shown in FIG. 2A-2B) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term "processor."

Figure 3:
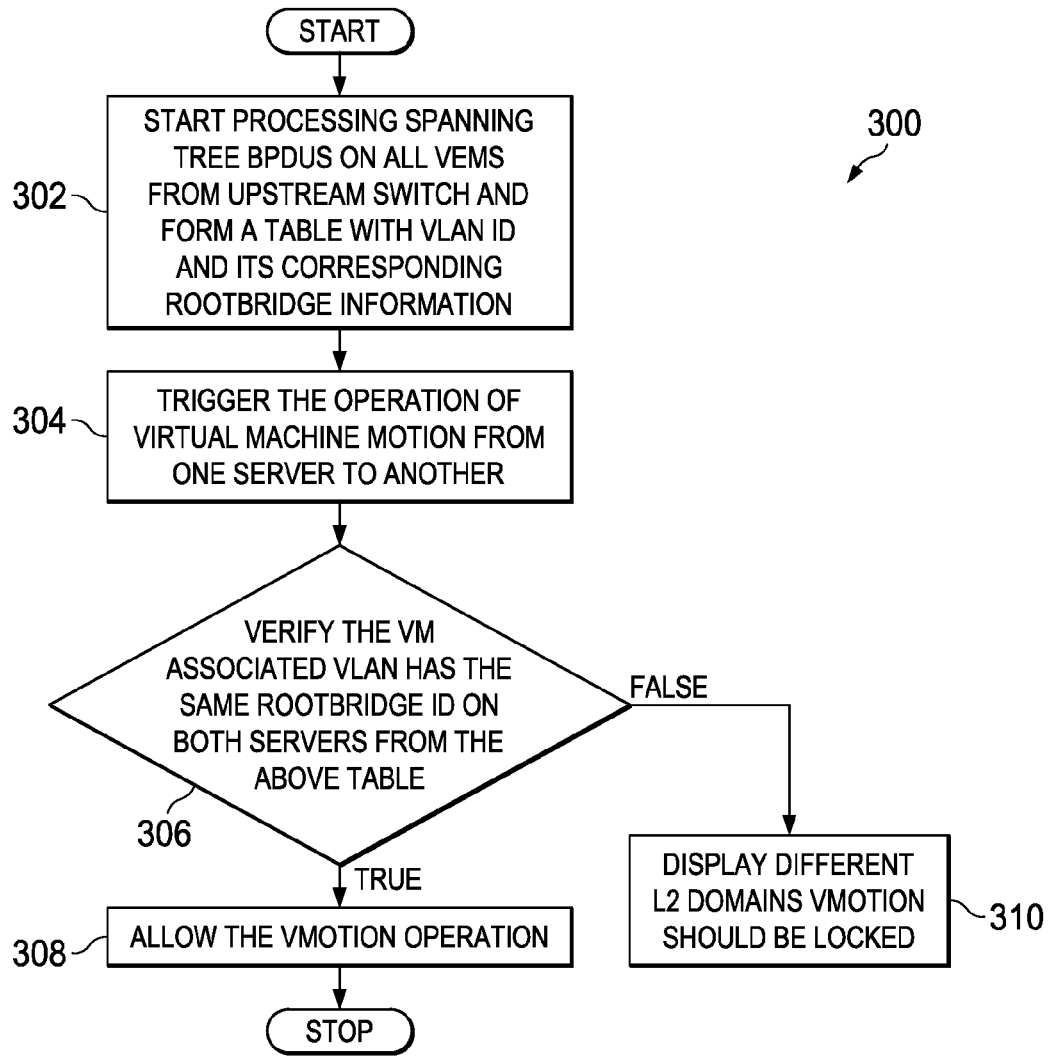
FIG. 3 is a simplified flowchart that illustrates potential operations that may be associated with verifying layer 2 connectivity for an effective migration of a virtual machine in example embodiments of the network environment.

FIG. 3 is a simplified flowchart 300 that illustrates potential operations that may be associated with verifying layer 2 connectivity for an effective migration of a virtual machine in example embodiments of network environment 100. In some embodiments, such operations may be associated with VSM 102. For example, the operations may be implemented in supervisor software 215, including path verification module 216 and table 220. Before describing the potential operations of FIG. 3 in detail, certain foundational information is provided for purposes of explaining certain aspects of link management in a bridged Ethernet network.

For an Ethernet network to function properly, only one active path can exist between two stations. Multiple active paths between stations cause loops in the network. If a loop exists in the network topology, the potential exists for a duplication of messages. When loops occur, some switches see stations appearing on both sides of the switch. This condition confuses the forwarding algorithm and allows duplicate frames to be forwarded. To provide path redundancy, a spanning tree protocol defines a tree that spans the switches in an extended network. A spanning tree protocol can force certain redundant data paths into a standby (blocked) state. If one network segment in the spanning tree becomes unreachable, or if the spanning tree protocol costs change, the spanning tree algorithm can reconfigure the spanning tree topology and reestablish the link by activating the standby path. The STP operation is generally transparent to end stations, which are unaware of whether they are connected to a single LAN segment, or to a switched LAN of multiple segments. In some embodiments of network environment 100, a standardized version of STP (e.g., IEEE 802.1D) may be used, while non-standard versions may be used in other embodiments.

Switches in an extended LAN (participating in STP) gather information on other switches in the network through an exchange of data messages. These messages can include bridge protocol data units (BPDUs), which are inclusive of configuration BPDUs, topology change notification (TCN) BPDUs, topology change notification acknowledgement (TCA) BPDUs, or any other suitable data segment that can achieve the same function. Exchanging configuration BPDUs results in the election of a unique root switch (i.e., the "root bridge") for the stable spanning tree network topology, the election of a designated switch for every switched LAN segment, and the removal of loops in the switched network by placing redundant switch ports in a backup state. The root bridge is the logical center of the spanning tree topology in a switched network and, in some embodiments, the bridge with the lowest bridge identifier may be elected as the root bridge.

BPDUs are exchanged regularly (e.g., every two seconds) and, further, enable switches to keep track of network changes and to start/stop forwarding ports, as appropriate. The root bridge is routinely identified in the BPDUs. Thus, referring to FIG. 3 for illustration again, at 302, STP BPDUs can be processed from upstream switches on VEMs to identify root bridges associated with each vLAN. A table (e.g., table 220) may be populated with vLAN identifiers and corresponding root bridge information.

At 304, movement of a virtual machine from one host (i.e., a server) to another may be detected. As used herein in this Specification, the broad term 'detect' is meant to encompass any type of identifying, noticing, receiving a signal, evaluating, checking, being alerted of, etc. associated with at least one migration (inclusive of movement) of a given machine. In one non-limiting example, a hypervisor manager may initiate the migration automatically in preparation for scheduled maintenance and, further, may send a request for data link layer continuity to a VSM. Alternatively, the origination host (e.g., a hypervisor or a VEM) may send the request to verify continuity. At 306, the root bridge can be checked for the vLAN(s) with which the virtual machine is associated. For example, the table of vLAN identifiers and the corresponding root bridge information can be checked to determine if the vLAN has the same root bridge ID on both the origination host and the destination host. If the root bridge of the destination host matches the root bridge of the origination host, the migration (i.e., "vmotion") can be allowed at 308. If the root bridge information does not match, the operation can be blocked at 310.

Figure 4:
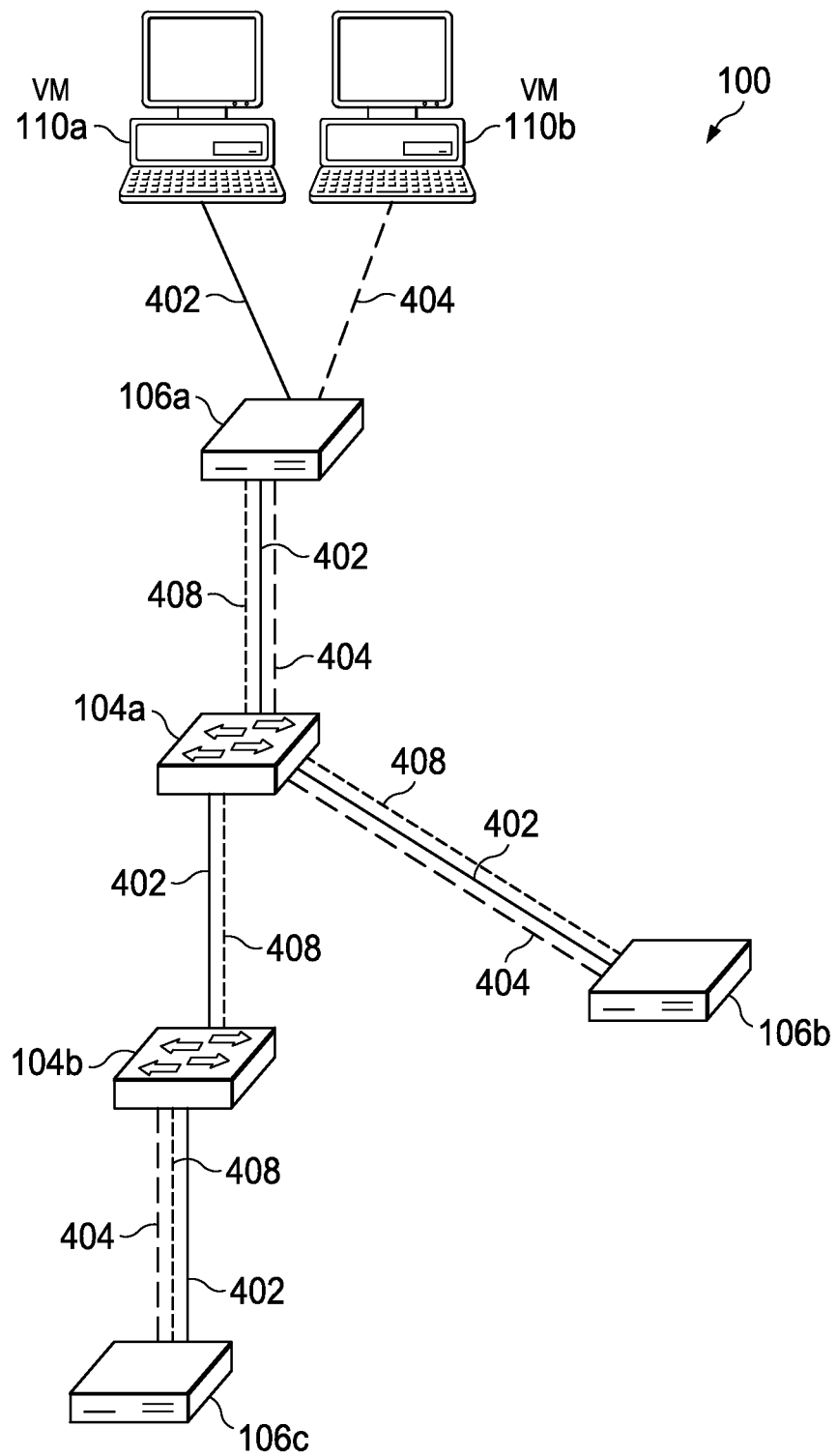
FIG. 4 is a simplified use case diagram illustrating potential scenarios in which layer 2 path connectivity may be verified during a live migration of virtual machines.

FIG. 4 is a simplified use case diagram illustrating potential scenarios in which network environment 100 may be used to verify layer 2 path connectivity during a live migration of virtual machines. As in FIG. 1, virtual machines 110a-110b are hosted on virtualized platform 106a. Virtual machine 110a is attached to a vLAN link 402 and virtual machine 110b is attached to a vLAN link 404. Root bridge information associated with vLAN links 402-404 may be stored in tables, for example, similar to those represented in FIG. 2B as table 220. Virtual machines may be migrated via a vLAN link 408. During operation, virtual machines 110a-110b may be migrated to either platform 106b or platform 106c, such as in response to a failure or maintenance operation on platform 106a, for example. For vLAN link 402, the root bridge ID remains the same on platforms 106a-106c, but the root bridge ID has different values from STP BPDUs on platform 106a and platform 106c. Hence, the migration of virtual machine 110b on vLAN link 404 (from platform 106a to platform 106c) would disrupt traffic. Network environment 100 (e.g., path verification module 216) can detect this disruption and block the migration.

Network environment 100 may provide significant advantages, some of which have already been discussed. For example, network environment 100 can detect layer 2 connectivity issues in a relatively short time without contributing additional network overhead. Moreover, the architecture is configured for checking the overall layer 2 connectivity for east-west traffic, as well as for upstream switches. The outlined protocol is straightforward to implement (i.e., minimal provisioning requirements). It should also be noted that teachings of the present disclosure are applicable to any switching platform in which live migration activities (e.g., for VMs) occur. This would include operations associated with, for example, VMware Distributed Resource Scheduler (DRS), manual live migrations, etc. For example, features discussed herein could be part of the parameters to be checked before executing a migration of VMs. Other scenarios could involve simple server provisioning, redundancy system provisioning, server farm provisioning, or any other suitable environment in which such activities could be valuable.

In the examples provided above, as well as numerous other potential examples, interaction may be described in terms of two, three, or four network elements. However, the number of network elements has been limited for purposes of clarity and example only. In certain cases, it may be easier to describe one or more of the functionalities of a given set of operations by only referencing a limited number of network elements. It should be appreciated that network environment 100 is readily scalable and can accommodate a large number of components, as well as more complicated/sophisticated arrangements and configurations. Accordingly, the examples provided should not limit the scope or inhibit the broad teachings of network environment 100 as potentially applied to a myriad of other architectures. Additionally, although described with reference to particular scenarios, where a particular module, such as path verification module 216, is provided within a network element, these modules can be provided externally, or consolidated and/or combined in any suitable fashion. In certain instances, such modules may be provided in a single proprietary unit.

It is also important to note that the appended diagrams illustrate only some of the possible scenarios and patterns that may be executed by, or within, network environment 100. For example, some operations may be deleted or removed where appropriate, or these operations may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by network environment 100 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for assisting a migration of a virtual machine from an origination host to a destination host, comprising:
   detecting the migration of the virtual machine from the origination host to the destination host, wherein the virtual machine is connected to a virtual network;
   comparing a first root bridge to a second root bridge to verify data link layer continuity of the virtual network on the destination host, wherein the first root bridge is associated with the virtual network on the origination host and is identified by evaluating protocol data units received from the origination host and the second root bridge is associated with the virtual network on the destination host and is identified by evaluating protocol data units received from the destination host;
   allowing the migration if the first root bridge and the second root bridge match; and
   blocking the migration if the first root bridge and the second root bridge are not the same.

2. The method of claim 1, wherein the first root bridge is identified by evaluating spanning tree bridge protocol data units received from associated with the origination host, and the second root bridge is identified by evaluating spanning tree bridge protocol data units received from the destination host.

3. The method of claim 1, wherein detecting the migration comprises receiving a request from the origination host to verify data link layer continuity of the virtual network on the destination host.

4. The method of claim 1, wherein detecting the migration comprises receiving a request from a hypervisor manager system to verify data link layer continuity of the virtual network on the destination host.

5. The method of claim 1, further comprising:
   blocking the migration if the first root bridge and the second root bridge are not the same, and
   wherein the first root bridge is identified by evaluating spanning tree bridge protocol data units associated with the origination host, and the second root bridge is identified by evaluating spanning tree bridge protocol data units associated with the destination host.

6. Logic encoded in one or more non-transitory media that includes code for execution and when executed by one or more processors is operable to perform operations for assisting a migration of a virtual machine from an origination host to a destination host, the operations comprising:

detecting the migration of the virtual machine from the origination host to the destination host, wherein the virtual machine is connected to a virtual network;

comparing a first root bridge to a second root bridge to verify data link layer continuity of the virtual network on the destination host, wherein the first root bridge is associated with the virtual network on the origination host and is identified by evaluating protocol data units received from the origination host and the second root bridge is associated with the virtual network on the destination host and is identified by evaluating protocol data units received from the destination host;

allowing the migration if the first root bridge and the second root bridge match; and blocking the migration if the first root bridge and the second root bridge are not the same.

7. The logic of claim 6, wherein the first root bridge is identified by evaluating spanning tree bridge protocol data units received from the origination host, and the second root bridge is identified by evaluating spanning tree bridge protocol data units received from the destination host.

8. The logic of claim 6, wherein detecting the migration comprises receiving a request from the origination host to verify data link layer continuity of the virtual network on the destination host.

9. The logic of claim 6, wherein detecting the migration comprises receiving a request from a hypervisor manager system to verify data link layer continuity of the virtual network on the destination host.

10. The logic of claim 6, wherein the operations further comprise: blocking the migration if the first root bridge and the second root bridge are not the same, and wherein the first root bridge is identified by evaluating spanning tree bridge protocol data units associated with the origination host, and the second root bridge is identified by evaluating spanning tree bridge protocol data units associated with the destination host.

11. A network element for assisting a migration of a virtual machine from an origination host to a destination host, comprising:

a path verification module;
  a memory for storing instructions; and
  a processor coupled to the memory and operable to execute the instructions such that the network element is configured for:

detecting the migration of the virtual machine from the origination host to the destination host, wherein the virtual machine is connected to a virtual network;

comparing a first root bridge to a second root bridge to verify data link layer continuity of the virtual network on the destination host, wherein the first root bridge is associated with the virtual network on the origination host and is identified by evaluating protocol data units received from the origination host and the second root bridge is associated with the virtual network on the destination host and is identified by evaluating protocol data units received from the destination host;

allowing the migration if the first root bridge and the second root bridge match; and blocking the migration if the first root bridge and the second root bridge are not the same.

12. The network element of claim 11, wherein the first root bridge is identified by evaluating spanning tree bridge protocol data units received from the origination host, and the second root bridge is identified by evaluating spanning tree bridge protocol data units received from the destination host.

13. The network element of claim 11, wherein detecting the migration comprises receiving a request from the origination host to verify data link layer continuity of the virtual network on the destination host.

14. The network element of claim 11, wherein detecting the migration comprises receiving a request from a hypervisor manager system to verify data link layer continuity of the virtual network on the destination host.

* * * * *